(12) United States Patent
Moon et al.

(10) Patent No.: US 10,354,289 B2
(45) Date of Patent: Jul. 16, 2019

(54) ELECTRONIC DEVICE AND METHOD OF PROVIDING ADVERTISEMENT DATA BY ELECTRONIC DEVICE

(71) Applicant: Samsung Electronics Co., Ltd., Suwon-si, Gyeonggi-do (KR)

(72) Inventors: Joo-Yi Moon, Seoul (KR); Sang-Heon Jeong, Seoul (KR); Cindy Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 727 days.

(21) Appl. No.: 14/290,135

(22) Filed: May 29, 2014

(65) Prior Publication Data
US 2015/0120469 A1    Apr. 30, 2015

(30) Foreign Application Priority Data
Oct. 24, 2013  (KR) ........................ 10-2013-0127188

(51) Int. Cl.
*G06Q 30/02*    (2012.01)
*G06K 9/62*    (2006.01)

(52) U.S. Cl.
CPC ........... *G06Q 30/0276* (2013.01); *G06K 9/62* (2013.01); *G06Q 30/0257* (2013.01)

(58) Field of Classification Search
None
See application file for complete search history.

(56) References Cited

U.S. PATENT DOCUMENTS

| | | | |
|---|---|---|---|
| 6,208,387 B1 | 3/2001 | Magnusson et al. | |
| 2005/0018216 A1 | 1/2005 | Barsness et al. | |
| 2006/0036959 A1* | 2/2006 | Heatherly | G06F 3/0481 |
| | | | 715/764 |
| 2007/0198921 A1 | 8/2007 | Collison et al. | |
| 2008/0231751 A1 | 9/2008 | Zalewski | |
| 2009/0192874 A1 | 7/2009 | Powles et al. | |

(Continued)

FOREIGN PATENT DOCUMENTS

| | | |
|---|---|---|
| CN | 101454793 A | 6/2009 |
| CN | 101641873 A | 2/2010 |

(Continued)

OTHER PUBLICATIONS

Matt Buchanan, Click: A Visual Tour of Camera Interfaces (Mar. 6, 2009), available online at https://web.archive.org/web/20090310233934/https://gizmodo.com/5165225/click-a-visual-tour-of-camera-interfaces (Year: 2009).*

(Continued)

*Primary Examiner* — Patricia H Munson
(74) *Attorney, Agent, or Firm* — Jefferson IP Law, LLP

(57) ABSTRACT

An electronic device is provided. The electronic device includes a display unit that displays an advertisement data list including one or more pieces of advertisement data in a preview mode, and a controller that detects one or more pieces of advertisement data according to a type of an object recognized in an image received in the preview mode among a plurality of pieces of advertisement data received from an advertisement server in the preview mode and displaying the advertisement data list including the detected one or more pieces of advertisement data.

24 Claims, 9 Drawing Sheets

(56) References Cited

U.S. PATENT DOCUMENTS

| | | | |
|---|---|---|---|
| 2009/0232354 A1* | 9/2009 | Camp, Jr. | G06Q 30/02 |
| | | | 382/103 |
| 2012/0271718 A1* | 10/2012 | Chung | G06Q 30/0241 |
| | | | 705/14.58 |
| 2013/0024293 A1* | 1/2013 | Tinsman | G06Q 30/0275 |
| | | | 705/14.68 |
| 2013/0144674 A1 | 6/2013 | Kim et al. | |
| 2015/0206349 A1* | 7/2015 | Rosenthal | H04N 21/41407 |
| | | | 345/633 |

FOREIGN PATENT DOCUMENTS

| | | |
|---|---|---|
| CN | 102204243 A | 9/2011 |
| KR | 10-2000-0024432 A | 5/2000 |
| KR | 10-2011-0095443 A | 8/2011 |
| KR | 10-2013-0061620 A | 6/2013 |

OTHER PUBLICATIONS

Chinese Office Action with English translation dated Jan. 17, 2019; Chinese Appln. No. 201480057942.1.

\* cited by examiner

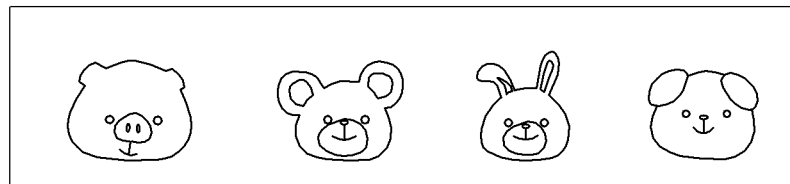
(a)
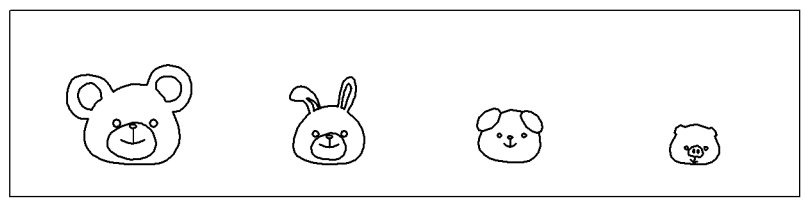
(b)
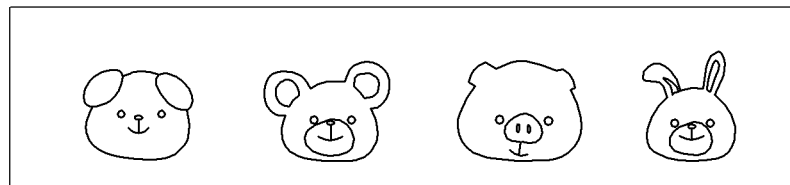
(c)
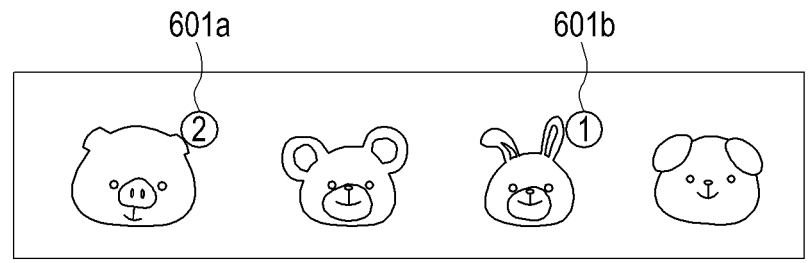
(d)
FIG.6

ND METHOD OF
ELECTRONIC DEVICE AND METHOD OF PROVIDING ADVERTISEMENT DATA BY ELECTRONIC DEVICE

CROSS-REFERENCE TO RELATED APPLICATION(S)

This application claims the benefit under 35 U.S.C. § 119(a) of a Korean patent application filed on Oct. 24, 2013 in the Korean Intellectual Property Office and assigned Serial number 10-2013-0127188, the entire disclosure of which is hereby incorporated by reference.

TECHNICAL FIELD

The present disclosure relates to an electronic device and a method of providing advertisement data. More particularly, the present disclosure relates to an electronic device and a method of providing advertisement data capable of inserting desired advertisement data into an image in a preview mode.

BACKGROUND

Among advertisements currently provided to users, a representative banner advertisement or an advertisement inserted at the beginning of a video is provided in such a manner that the advertisement is mounted to an application.

However, since the advertisement is provided in such a manner that the advertisement is mounted to the application, the user cannot select, edit, or store an advertisement logo or the like included in the advertisement.

Accordingly, the stereotype is created that the banner advertisement or the advertisement inserted into the beginning of the video is "forcibly exposed", and the stereotype is emphasized on a limited and small screen, particularly such as a desktop computer, a TeleVision (TV), or an electronic device. Thus, there exists a need for an improved apparatus and method for providing advertisement data.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method of providing advertisement data capable of inserting desired advertisement data into an image in a preview mode.

Another aspect of the present disclosure is to provide an electronic device capable of inserting desired advertisement data into an image in a preview mode and a method of providing advertisement data.

Another aspect of the present disclosure is to provide an electronic device capable of providing a realization that the advertisement improves the quality of life and is considerate of each individual, and a method of providing advertisement data.

Another aspect of the present disclosure is to provide an electronic device capable of realizing the human-business in which customers can directly select the advertisement and accordingly advertising earnings can be made in business, and a method of providing advertisement data.

In accordance with an aspect of the present disclosure, an electronic device is provided. The electronic device includes a display unit configured to display an advertisement data list including one or more pieces of advertisement data in a preview mode and a controller configured to detect one or more pieces of advertisement data according to a type of an object recognized in an image received in the preview mode among a plurality of pieces of advertisement data received from an advertisement server in the preview mode and displaying the advertisement data list including the detected one or more pieces of advertisement data.

In accordance with another aspect of the present disclosure, a method of providing advertisement data by an electronic device is provided. The method includes when a plurality of pieces of advertisement data are received from an advertisement server in a preview mode, detecting one or more pieces of advertisement data according to a type of an object recognized in an image received in the preview mode among the plurality of pieces of advertisement data, and displaying an advertisement data list including the detected one or more pieces of advertisement data in the preview mode.

Through an electronic device and a method of providing advertisement data according to various embodiments of the present disclosure, a user can directly select an image given by an advertisement logo or a desired brand, thereby minimizing an aversion to the advertisement exposure and providing a better user experience. Further, the user can receive a reward by participating in an event while receiving convenience through storage of an image into which advertisement data is inserted. In addition, an advertisement server can differentiate and enhance charges of advertisement products according to a type, a size, or a position of advertisement data inserted as a model for creating profits, in providing the advertisement products.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a view for describing an operation of displaying an advertisement-inserted image according to an embodiment of the present disclosure;

Throughout the drawings, it should be noted that like reference numbers are used to depict the same or similar elements, features, and structures.

DETAILED DESCRIPTION

Figure 1:
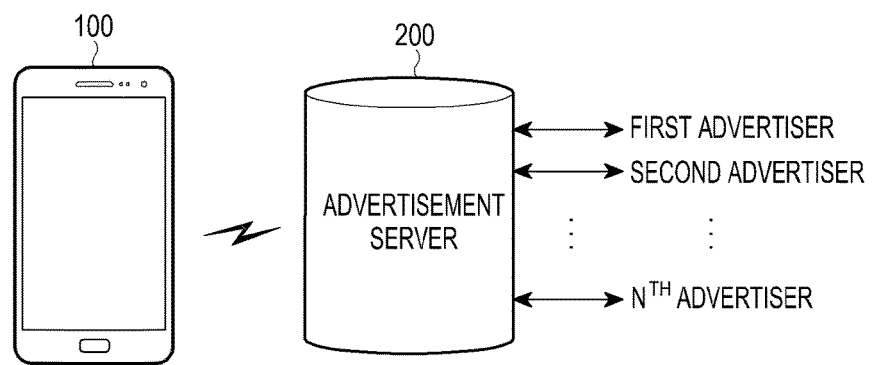
FIG. 1 illustrates a configuration of an advertisement data providing system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the present disclosure may be a device having a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, an electronic bracelet, an electronic appcessory, a camera, a wearable device, an electronic clock, a wrist watch, a home appliance (for example, refrigerator, air conditioner, vacuum cleaner, oven, microwave oven, washing machine, air cleaner, and the like), an artificial intelligence robot, a TeleVision (TV), a Digital Video Disk (DVD) player, an audio player, various types of medical devices (for example, Magnetic Resonance Angiography (MRA), Magnetic Resonance Imaging (MRI), Computed Tomography (CT), scanner, an ultrasonic device, and the like), a navigation device, a Global Positioning System (GPS) receiver, an Event Data Recorder (EDR), a Flight data Recorder (FDR), a set-top box, a TV box (for example, Samsung HomeSync™, Apple TV™, or Google TV™), an electronic dictionary, a vehicle infotainment device, electronic equipment for a ship (for example, a navigation device for a ship, a gyro compass, and the like), avionics, a security device, electronic clothes, an electronic key, a camcorder, game consoles, a Head-Mounted Display (HMD), a flat panel display device, an electronic frame, an electronic album, furniture or a part of buildings/structures having a communication function, an electronic board, an electronic signature receiving device, a wearable device, and a projector. It is apparent to those skilled in the art that the electronic device according to various embodiments of the present disclosure is not limited to the above described devices.

FIG. 1 illustrates a configuration of an advertisement data providing system according to an embodiment of the present disclosure.

Referring to FIG. 1, the advertisement data providing system includes an electronic device 100 and an advertisement server 200.

The electronic device 100 may provide advertisement data received from the advertisement server 200 in a list form in a preview mode in which an image is received through a camera unit and store an image (hereinafter referred to as an "advertisement-inserted image") into which advertisement data selected from the advertisement data list is inserted.

In order to increase a reward score of a user, the electronic device 100 may transmit an advertisement data request, advertisement data selection information, or storage information of the advertisement-inserted image according to an advertisement data list display selection by user in the preview mode to the advertisement server 200.

Further, the electronic device 100 may receive advertisement information related to the advertisement data of the stored advertisement-inserted image from the advertisement server 200 to display continuously updated advertisement information.

A configuration of an electronic device according to an embodiment of the present disclosure will be described in more detail with reference to FIG. 2 below.

When the advertisement server 200 receives an advertisement data request from the electronic device 100, the advertisement server 200 may provide advertisement data provided from affiliated advertisers to the electronic device 100.

Further, when the advertisement server 200 receives the advertisement data request or selection information of particular advertisement data, the advertisement server 200 may differentially increase and store a reward score of the user of the electronic device, and may differentially increase and store a reward score of the user of the electronic device 100 according to a type of particular advertisement data detected through the selection information of the particular advertisement data. The type of particular advertisement data may include at least one of an advertisement logo and an advertisement background image.

Further, when the advertisement server 200 receives editing information of the particular advertisement data or storage information of the advertisement-inserted image, the advertisement server 200 may differentially increase and store the reward score of the user of the electronic device 100, and differentially increase and store the reward score of the user of the electronic device 100 according to an editing type detected through the editing information of the particular advertisement data. The editing information of the particular advertisement data may include a position where the particular advertisement data is inserted in the preview mode of the electronic device 100, or a size or transparency of the particular advertisement data.

Further, when the advertisement server 200 receives the selection information of the advertisement information from the electronic device 100, the advertisement server 200 may increase and store the reward score of the user of the electronic device. The advertisement information may include a web site of a company corresponding to the advertisement data or an advertisement event.

When the advertisement server 200 receives background image setting information of a particular advertisement-inserted image from the electronic device 100, the advertisement server 200 may increase and store the reward score of the user of the electronic device 100, and transmit updated advertisement data to the electronic device 100 whenever the advertisement information related to the advertisement data of the particular advertisement-inserted image set as the background image is updated.

Further, the advertisement server 200 may impose a differentiated charge to a corresponding advertiser according to the reception of the advertisement data request or the selection information of the advertisement data to display the advertisement data list on the electronic device 100.

Figure 2:
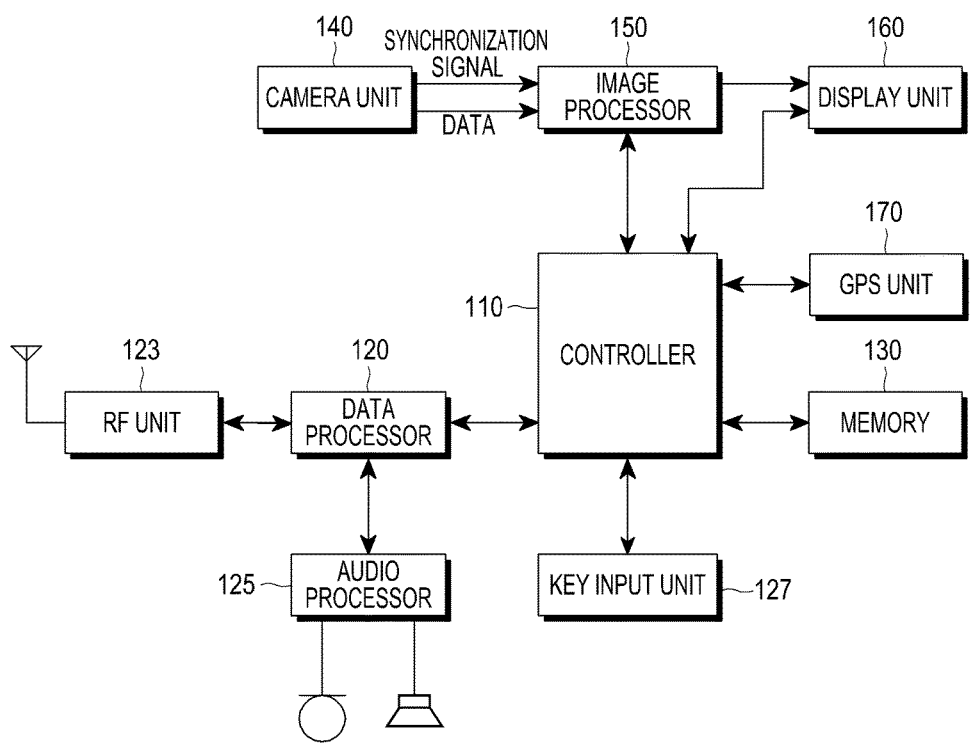
FIG. 2 is a block illustrating an electronic device according to an embodiment of the present disclosure.

FIG. 2 is a block diagram illustrating an electronic device according to an embodiment of the present disclosure.

Referring to FIG. 2, a Radio Frequency (RF) unit 123 performs a wireless communication function of the electronic device. The RF unit 123 may include an RF transmitter for up-converting and amplifying a frequency of a transmitted signal and an RF receiver for low noise-amplifying a received signal and down-converting a frequency. A data processor 120 may include a transmitter for coding and modulating the transmitted signal and a receiver for demodulating and decoding the received signal. That is, the data processor 120 may include a modem and a codec. The codec may include a data codec for processing packet data and an audio codec for processing an audio signal such as a voice. An audio processor 125 may perform a function of reproducing a received audio signal output from the audio codec of the data processor 120 or transmitting a transmitted audio signal generated from a microphone to the audio codec of the data processor 120.

A key input unit 127 may include keys for inputting number and character information and function keys for setting various functions.

A memory 130 may include a program memory and data memories. The program memory may store programs for controlling a general operation of the electronic device and programs for controlling such that advertisement data selected by the user is inserted into an image of a preview mode. Further, the data memory may perform a function of temporarily storing data generated during executions of the programs.

The memory 130 may store one or more advertisement-inserted images together with tag information according to various embodiments of the present disclosure, and the tag information may store information on advertisement data inserted into the advertisement-inserted image.

The one or more advertisement-inserted images may be stored in a separate area of the memory 130, for example, an advertisement folder together with the tag information.

A controller 110 performs a function of controlling the general operation of the electronic device.

According to various embodiments of the present disclosure, the controller 110 may display an advertisement data list including advertisement data in a preview mode and insert advertisement data selected from the advertisement data list into an image received in the preview mode. When photographing is selected, the controller 110 may store the image into which the advertisement data is inserted as an advertisement-inserted image. The advertisement data may include at least one of an advertisement logo and an advertisement background image.

The controller 110 may sequentially display advertisement data received from the advertisement server 200 according to an order of provision from the advertisement server 200 in the advertisement data list displayed in the preview mode.

Alternatively, the controller 110 may sequentially display advertisement data received from the advertisement server 200 according to an order of companies close to a current position of the electronic device 100 received from a GPS unit 170 in the advertisement data list displayed in the preview mode.

Alternatively, the controller 110 may sequentially display advertisement data received from the advertisement server 200 according to a user preference (for example, a frequency of use) in the advertisement data list displayed in the preview mode.

Further, the controller 110 may also display an indicator informing of the event generation in the advertisement data including event information among the advertisement data included in the advertisement data list.

When displaying of the advertisement data list is selected in the preview mode according to a first embodiment of the present disclosure, the controller 110 may make a request for advertisement data to the advertisement server 200 and display the advertisement data list including advertisement data received from the advertisement server 200. When particular advertisement data is selected from the advertisement data list, the controller 110 may transmit selection information of the particular advertisement data to the advertisement server 200, insert the particular advertisement data into an object of an image received in the preview mode, and display the object. When photographing is selected, the controller 110 may store the image into which the particular advertisement data is inserted in an advertisement folder of the memory 13 as the advertisement-inserted image.

The controller 110 may automatically recognize the object in the image received in the preview mode by using a known object recognition technology, and the object may include an item object, such as a coffee cup or a vehicle, or a body object, such as a particular body part of a human. An advertisement logo of the advertisement data may be inserted into the object recognized in the image received in the preview mode.

The controller 110 may recognize an empty area other than the item object or the body object in the image displayed on the display unit 160 in the preview mode by using the object recognition technology and insert an advertisement background image of the advertisement data into the empty area.

Alternatively, the controller 110 may recognize a movement of the object in the image received in the preview mode, insert an advertisement background image of the advertisement data corresponding to the movement of the object into the image, and display the image.

When editing of the particular advertisement data inserted into the image is executed in the preview mode, the controller 110 may store editing information of the particular advertisement data, and the editing information of the particular advertisement data may include at least one of a position where the particular advertisement data is inserted, or a size or transparency of the particular advertisement data.

When photographing is selected while the image into which the particular advertisement data is inserted is displayed in the preview mode, the controller 110 may store the image into which the advertisement data is inserted in the advertisement folder of the memory 130 as the advertisement-inserted image and transmit storage information of the advertisement-inserted image to the advertisement server 200. At this time, if there is editing information of the particular advertisement data of the image into which the advertisement is inserted, the controller 110 may insert the editing information into the storage information of the advertisement-inserted image and transmit the storage information to the advertisement server 200.

In order to increase the reward score of the user of the electronic device, the controller 110 may transmit an advertisement data request for displaying the advertisement data list, selection information of particular advertisement data selected from the advertisement data list, storage information of the advertisement-inserted image corresponding to the image into which the particular advertisement data is inserted, or storage information of the advertisement-inserted image corresponding to the image into which the particular advertisement data is inserted including editing information of the particular advertisement data to the advertisement server 200.

Further, when the advertisement-inserted image is transmitted to a service company of the advertisement data of the advertisement-inserted image as an authentication picture, the controller 110 may transmit authentication picture transmission information to the advertisement server 200 in order to increase the reward score of the user of the electronic device.

When displaying of the advertisement data list is selected in the preview mode according to a second embodiment of the present disclosure, the controller 110 may make a request for advertisement data to the advertisement server 200 and receive advertisement data. The controller 110 may detect advertisement data according to a type of object recognized in the image received in the preview mode from the advertisement data and display the advertisement data list including the detected advertisement data. The controller 110 may automatically recognize the object in the image received in the preview mode by using the known object recognition technology or may recognize the object selected by the user.

When displaying of the advertisement-inserted image is selected according to various embodiments of the present disclosure, the controller 110 may display one or more advertisement-inserted images stored in the advertisement folder among images stored in the memory 130. When a particular advertisement-inserted image is selected from the one or more advertisement-inserted images, the controller 110 may transmit selection information of the particular advertisement-inserted image to the advertisement server 200. When updated advertisement information related to the advertisement data of the particular advertisement-inserted image is received from the advertisement server 200, the controller 110 may display the updated advertisement information related to the advertisement data of the particular advertisement-inserted image while the particular advertisement-inserted image is displayed. When the advertisement information is selected, the controller 110 may transmit selection information of the advertisement information to the advertisement server 200 to increase the reward score of the user of the electronic device and display the advertisement information. The advertisement information may include a website of a company corresponding to the advertisement data or an advertisement event. Accordingly, when the website of the company corresponding to the advertisement data is selected, the controller 110 may access and display the website of the company corresponding to the advertisement data. Alternatively, when the advertisement event is selected, the controller 110 may access the website of the company corresponding to the advertisement data and display event contents corresponding to the advertisement event.

When classifying of the one or more advertisement-inserted images based on a type of advertisement data is selected according to various embodiments of the present disclosure, the controller 110 may transmit type information of the advertisement data to the advertisement server 200. When related updated advertisement information according to the type of advertisement data is received from the advertisement server 200, the controller 110 may display the related updated advertisement information according to the type of advertisement data while the one or more advertisement-inserted images are classified according to the type of advertisement data and the classified images are displayed. When the advertisement information is selected, the controller 110 may transmit selection information of the advertisement information to the advertisement server 200 to increase the reward score of the user of the electronic device and display the advertisement information.

When a particular advertisement-inserted image of the one or more advertisement-inserted images stored in the electronic device is set as a background image according to various embodiments of the present disclosure, the controller 110 may transmit background image setting information of the particular advertisement-inserted image to the advertisement server 200. The controller 110 may update and display advertisement information related to the advertisement data of the particular advertisement-inserted image received from the advertisement server 200 while the particular advertisement-inserted image is displayed as the background image.

Although it has been described in various embodiments of the present disclosure as an example that the advertisement data is inserted into the image received in the preview mode, the advertisement data may be inserted and stored in a video photographing. When the video photographing is selected in a state where the advertisement data is inserted into the object recognized in the image received in the preview mode, the controller 110 may detect a movement of the object and move the advertisement data in accordance with the movement of the object, so as to photograph the video while maintaining the insertion of the advertisement data into the object.

A camera unit 140 photographs image data, and includes a camera sensor for converting a photographed optical signal to an electrical signal and a signal processor for converting an analog image signal photographed by the camera sensor to digital data. It is assumed that the camera sensor is a Charge Coupled Device (CCD) or Complementary Metal Oxide Semiconductor (CMOS) sensor, and the signal processor may be implemented by a Digital Signal Processor (DSP). Further, the camera sensor and the signal processor may be implemented integrally or separately.

An image processor 150 performs Image Signal Processing (ISP) for displaying an image signal output from the camera unit 140 on a display unit 160, and the ISP performs functions such as gamma correction, interpolation, spatial change, image effect, image scale, AWB, AE, AF and the like. Accordingly, the image processor 150 processes the image signal output from the camera unit 140 in the unit of frames and outputs frame image data in accordance with a characteristic and a size of the display unit 160. Further, the image processor 150 may include an image codec and perform a function of compressing the frame image data displayed on the display unit 160 through a set method or reconstructing the compressed frame image data into original frame image data. The image codec may include a JPEG codec, an MPEG4 codec, a Wavelet codec and the like. It is assumed that the image processor 150 includes an On Screen Display (OSD) function and may output on screen display data in accordance with a screen size displayed under a control of the controller 110.

The display unit 160 may display an image signal output from the image processor 150 and display user data output from the controller 110. The display unit 160 may use a Liquid Crystal Display (LCD). In this case, the display unit 160 may include an LCD controller, a memory for storing image data, and an LCD display device. When the LCD is implemented in a touch screen type, the LCD may operate as an input unit, and the display unit 160 may display keys such as the key input unit 127.

Further, when the display unit 160 is implemented in the touch screen type and thus used as a touch screen unit, the touch screen unit may be configured by a Touch Screen Panel (TSP) including a plurality of sensor panels and the plurality of sensor panels may include a capacitive type sensor panel capable of recognizing a hand touch and an electromagnetic induction type sensor panel capable of detecting a fine touch, such as a touch pen.

The display unit 160 may display an advertisement data list including advertisement data in the preview mode according to various embodiments of the present disclosure.

Further, the display unit 160 may display updated advertisement data related to the advertisement data of the advertisement-inserted image while the advertisement-inserted image is displayed according to various embodiments of the present disclosure.

In addition, the display unit 160 may display updated advertisement data related to the advertisement data of the advertisement-inserted image set as the background image while the advertisement-inserted image is displayed as the background image according to various embodiments of the present disclosure.

The GPS unit 170 may detect current position information of the electronic device 100 and transmit the detected current position information of the electronic device 100 to the controller 110.

An operation of providing advertisement data in an electronic device according to an embodiment of the present disclosure will be described with reference to FIGS. 3 to 9.

Figure 3:
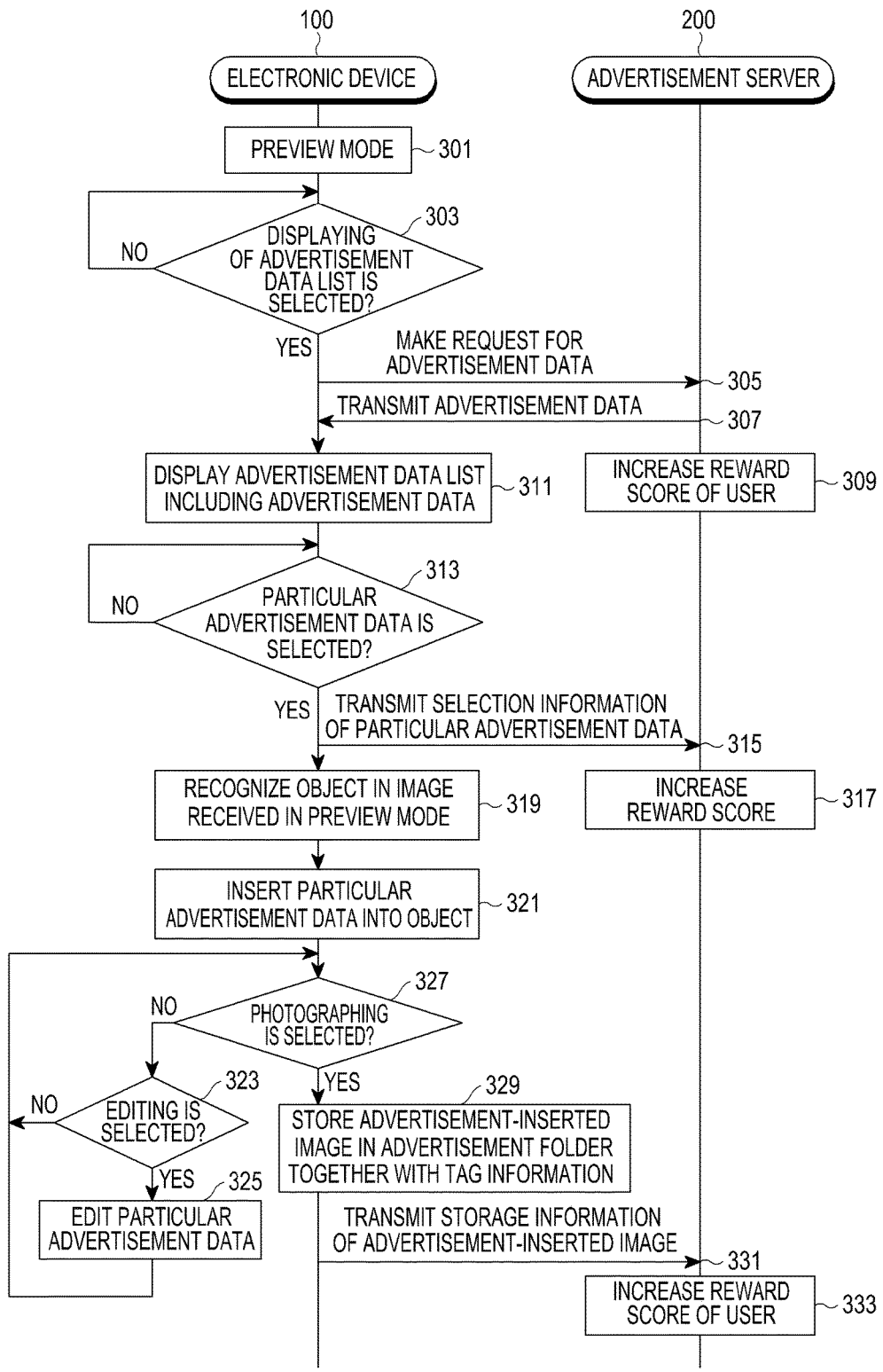
FIG. 3 is a flowchart illustrating an operation of providing advertisement data according to a first embodiment of the present disclosure.

FIG. 3 is a flowchart illustrating an operation of providing advertisement data in the electronic device according to a first embodiment of the present disclosure.

Hereinafter various embodiments of the present disclosure may be described with reference to FIGS. 1 and 2.

Referring to FIG. 3, when a camera application is selected in the electronic device 100, the controller 110 may switch a mode of the electronic device 100 to a preview mode in which an image received through the camera unit 140 is displayed on the display unit 160 in operation 301.

When the controller 110 determines that displaying of an advertisement data list is selected in the preview mode in operation 303, the controller 110 may perform operation 305 of making a request for the advertisement data to the advertisement server 200.

The advertisement server 200 having received the advertisement data request from the electronic device 100 may transmit advertisement data provided from advertisers of affiliated companies to the electronic device 100 in operation 307. The advertisement server 200 may determine the advertisement data request for displaying the advertisement data list on the electronic device 100 as a reward score and perform operation 309 of increasing the reward score of the user of the electronic device 100.

When advertisement data are received from the advertisement server 200, the controller 110 may perform an operation of displaying the advertisement data list including the advertisement data in the preview mode in operation 311.

The advertisement data included in the advertisement data list may be provided as at least one of an advertisement logo indicating a corresponding company or an advertisement background image.

The controller 110 may differentially display an order of the advertisement data in the advertisement data list according to a setting.

For example, the controller 110 may sequentially display advertisement data received from the advertisement server 200 according to an order of provision from the advertisement server 200 or according to an order of companies close to a current position of the electronic device 100 received from the GPS unit 170 in the advertisement data list displayed in the preview mode. Alternatively, the controller 110 may sequentially display advertisement data received from the advertisement server 200 according to a user preference (for example, a frequency of use) in the advertisement data list displayed in the preview mode.

Further, the controller 110 may also display an indicator informing of the event generation in advertisement data including event information among the advertisement data included in the advertisement data list while the advertisement data are displayed in the advertisement data list. The controller 110 may receive the event information included in the advertisement data from the advertisement server 200 in real time while the advertisement data list is displayed.

When the controller 110 determines that particular advertisement data is selected from the advertisement data list displayed in the preview mode in operation 313, the controller 110 may perform operation 315 of transmitting selection information of the particular advertisement data to the advertisement server 200.

The advertisement server 200 having received the selection information of the particular advertisement data may determine the selection information of the particular advertisement data as the reward score and perform operation 317 of increasing the reward score of the user of the electronic device 100. In operation 317, the advertisement server 200 may differentially increase the reward score according to a type of advertisement data (for example, advertisement logo or advertisement background image) selected through the selection information of the particular advertisement data and differentially impose a charge on a company of the selected advertisement data.

The controller 110 may transmit the selection information of the particular advertisement data to the advertisement server 200, automatically recognize an object in the image received in the preview mode in operation 319, and perform operation 321 of inserting the particular advertisement data into the recognized object. A plurality of objects can be recognized in the preview mode, and the particular advertisement data can be inserted into the plurality of recognized objects.

When the controller 110 determines that photographing is not selected in operation 327 while the particular advertisement data is displayed in the preview mode, the controller 110 may perform operation 323 of determining whether editing is selected. When the controller 110 determines that editing is selected in operation 323 while the image into which the particular advertisement data is inserted is displayed in the preview mode, the controller 110 may perform operation 325 of switching the preview mode to an editing mode in which the particular advertisement data inserted into the image can be edited. Editing types which can be performed in the editing mode may include a change in a position of the particular advertisement data, an adjustment of a size of the particular advertisement data, or processing of transparency of the particular advertisement data, and may include a deletion of the advertisement data when a plurality of advertisement data are displayed.

When the editing of the particular advertisement data is completed in the editing mode, the controller 110 may store editing information by which the type of performed editing can be known. When the controller 110 determines that photographing is selected in operation 327 while the particular advertisement data is displayed in the preview mode, the controller 110 may perform operation 329 of storing the image into which the particular advertisement data is inserted in an advertisement folder of the memory 130 as an advertisement-inserted image together with tag information. The tag information may store information on the advertisement data inserted into the advertisement-inserted image.

When the advertisement-inserted image is stored in the advertisement folder of the memory 130, the controller 110 may transmit storage information of the advertisement-inserted image to the advertisement server 200 in operation 331. When there is editing information of the particular advertisement data of the advertisement-inserted image, the editing information may be included in the storage information of the advertisement-inserted image.

The advertisement server 200 having received the storage information of the advertisement-inserted image from the electronic device 100 may determine the storage information of the advertisement-inserted image as a reward score and perform operation 333 of increasing the reward score of the user of the electronic device 100. When advertisement data are inserted into a plurality of objects through the storage information of the advertisement-inserted image, the advertisement server 200 may differentially increase the reward score according to the number of inserted advertisement data and differentially impose the charge on the company of the selected advertisement data in operation 333. Further, in operation 333, the advertisement server 200 may differentially increase the reward score according to the type of editing (insertion position, size, or transparency) of the particular advertisement data of the advertisement-inserted image through the editing information included in the storage information of the advertisement-inserted image and differentially impose the charge on the company of the selected advertisement data.

Figure 4:
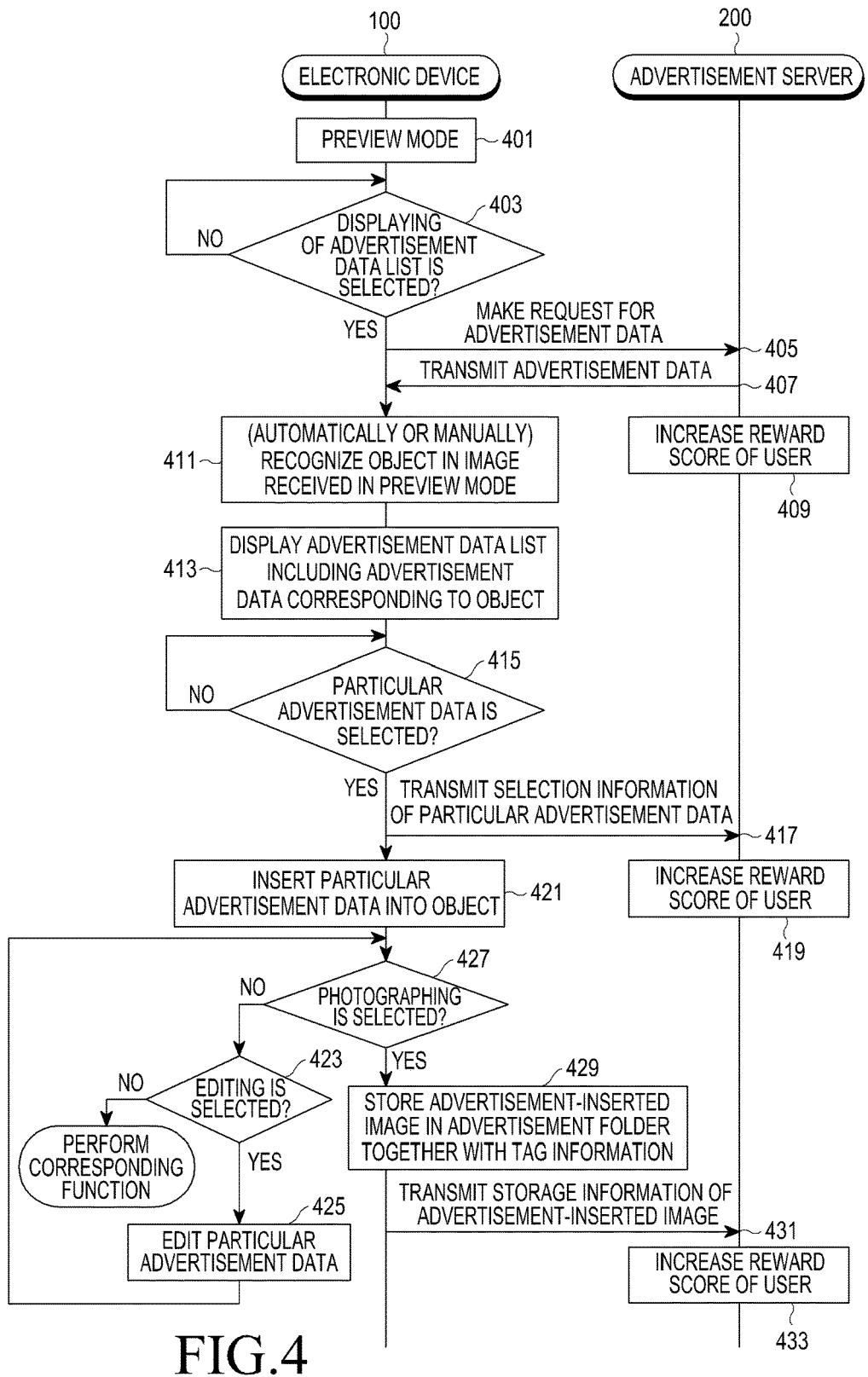
FIG. 4 is a flowchart illustrating an operation of providing advertisement data according to a second embodiment of the present disclosure.
Figure 5:
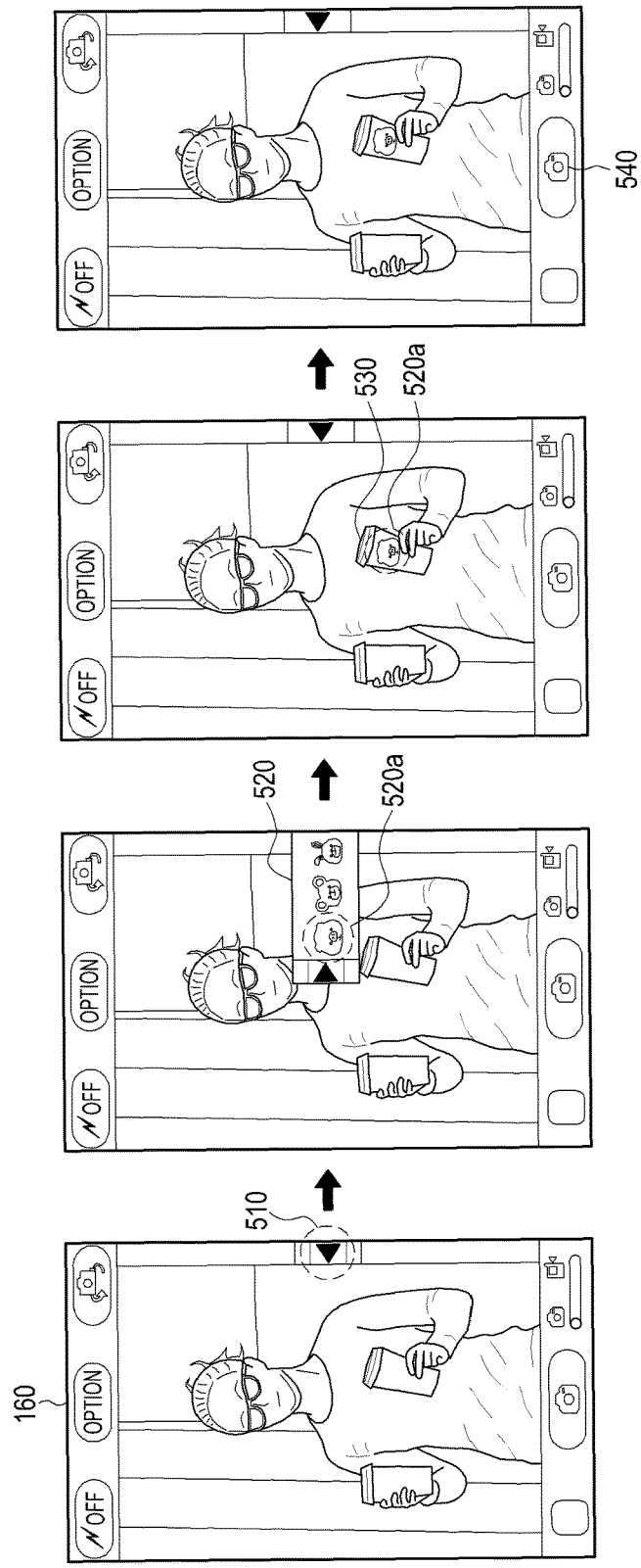
FIGS. 5A, 5B, 5C, and 5D are views for describing an operation of inserting advertisement data in a preview mode of an electronic device according to an embodiment of the present disclosure.

FIG. 4 is a flowchart illustrating an operation of providing advertisement data according to a second embodiment of the present disclosure.

Hereinafter various embodiments of the present disclosure may be described with reference to FIGS. 1 and 2.

Referring to FIG. 4, when a camera application is selected in the electronic device 100, the controller 110 may switch a mode of the electronic device 100 to a preview mode in which an image received through the camera unit 140 is displayed on the display unit 160 in operation 401.

When the controller 110 determines that displaying of an advertisement data list is selected in the preview mode in operation 403, the controller 110 may perform operation 405 of making a request for the advertisement data to the advertisement server 200.

The advertisement server 200 having received the advertisement data request from the electronic device 100 may transmit advertisement data provided from advertisers of affiliated companies to the electronic device 100 in operation 407. The advertisement server 200 may determine the advertisement data request for displaying the advertisement data list on the electronic device 100 as a reward score and perform operation 409 of increasing the reward score of the user of the electronic device 100.

When the advertisement data are received from the advertisement server 200, the controller 100 may determine a type of recognized object in the preview mode in operation 411. In operation 411, the controller 110 may determine the type of an automatically recognized object or may recognize the object selected by the user.

The controller 110 may detect advertisement data according to the type of recognized object among one or more objects received from the advertisement server 200 and display only the detected advertisement data in the advertisement data list according to a set order in operation 413. For example, when the recognized object is a cup, the controller 110 may detect advertisement data according to beverages or coffee and display the detected advertisement data in the advertisement data list. The type of advertisement data according to the type of object may be preset and stored in the memory 130.

Alternatively, the controller 110 may display only the detected advertisement data in the advertisement data list according to a set order.

For example, the controller 110 may sequentially display the detected advertisement data according to an order of provision from the advertisement server 200 or according to an order of companies close to a current position of the electronic device 100 received from the GPS unit 170 in the advertisement data list displayed in the preview mode. Alternatively, the controller 110 may sequentially display the detected advertisement data received according to a user preference (for example, a frequency of use) in the advertisement data list displayed in the preview mode.

Further, the controller 110 may also display an indicator informing of the event generation in advertisement data including event information among the detected advertisement data while the detected advertisement data is displayed in the advertisement data list. The controller 110 may receive the event information included in the advertisement data from the advertisement server 200 in real time while the advertisement data list is displayed.

When the controller 110 determines that particular advertisement data is selected from the advertisement data list displayed in the preview mode in operation 415, the controller 110 may perform operation 417 of transmitting selection information of the particular advertisement data to the advertisement server 200.

The advertisement server 200, having received the selection information of the particular advertisement data from the electronic device 100, may determine the selection information of the particular advertisement data as a reward score and perform operation 419 of increasing the reward score of the user of the electronic device 100. In operation 419, the advertisement server 200 may differentially increase the reward score according to a type of advertisement data (for example, advertisement logo or advertisement background image) selected through the selection information of the particular advertisement data and differentially impose a charge on a company of the selected advertisement data.

The controller 110 may transmit the selection information of the particular advertisement data to the advertisement server 200 and perform operation 421 of inserting the particular advertisement data into the object recognized in operation 411. A plurality of objects can be recognized in the preview mode, and the particular advertisement data can be inserted into the plurality of recognized objects.

Since operations 423 to 433 are substantially the same as operations 323 to 333 of FIG. 3, descriptions thereof will be omitted.

As described above, an example of an operation of inserting the advertisement data into the object in the preview mode may be described with reference to FIGS. 5A, 5B, 5C, 5D, and 6.

FIGS. 5A to 5D are views for describing an operation of inserting advertisement data in the preview mode of the electronic device according to an embodiment of the present disclosure.

FIG. 6 is a view for describing an operation of displaying an advertisement-inserted image according to an embodiment of the present disclosure.

Referring to FIG. 5A, when a key 510 for displaying an advertisement data list in the preview mode in which an image received through the camera unit is displayed is selected, an advertisement data list 520 including advertisement data received from the advertisement server 200 may be displayed in the preview mode as illustrated in FIG. 5B.

When particular advertisement data (e.g., coffee advertisement logo) 520a is selected from the advertisement data list 520 displayed in FIG. 5B, the particular advertisement data (e.g., coffee advertisement logo) 520a may be automatically inserted into a recognized object (e.g., cup) 530 of the image received in the preview mode as illustrated in FIG. 5C. The particular advertisement data (e.g., coffee advertisement logo) 520a automatically inserted into the recognized object (e.g., cup) 530 in the preview mode may be edited through a position adjustment, a size adjustment, or transparency processing in an editing mode.

When a photographing button 540 is selected as illustrated in FIG. 5D after the particular advertisement data (e.g., coffee advertisement logo) 520a is automatically inserted into the recognized object (e.g., cup) 530 in the preview mode, the image of the particular advertisement data (e.g., coffee advertisement logo) 520a inserted into the recognized object (e.g., cup) 530 may be stored in an advertisement folder of the memory 130 as an advertisement-inserted image as illustrated in FIG. 5D. The advertisement-inserted image is stored together with tag information, and the tag information may store the type of advertisement data (e.g., coffee advertisement logo), editing information of the advertisement data, and company information corresponding to the advertisement data as information on the particular advertisement data of the advertisement-inserted image.

Referring to FIG. 5B, an order of the display of the advertisement data 520a included in the advertisement data list 520 may vary depending on a setting.

Advertisement data received from the advertisement server 200 may be sequentially displayed according to an order of provision from the advertisement server 200 as illustrated in screen (a) of FIG. 6, or may be sequentially displayed according to an order of companies close to a current position of the electronic device 100 received from the GPS unit 170 as illustrated in screen (b) of FIG. 6. Alternatively, advertisement data received from the advertisement server 200 may be sequentially displayed according to user preference (for example, a frequency of use) as illustrated in screen (c) of FIG. 6.

When there are advertisement data including event information in the advertisement data received from the advertisement server 200, indicators 601a and 601b informing of the event generation in the advertisement data including the event information among the advertisement data included in the advertisement data list may be also displayed as illustrated in screen (d) of FIG. 6. The indicator may be displayed in various shapes, and may be displayed as a number indicating the number of events as illustrated in screen (d) of FIG. 6. When the indicator is selected, contents of the event may be displayed through an access to a website of a corresponding company.

Through the operation of FIGS. 3 and 4, an operation of storing the advertisement-inserted image in the advertisement folder of the memory and providing updated advertisement information corresponding to the advertisement data of the stored advertisement-inserted image may be described with reference to FIGS. 7 to 9.

Figure 7:
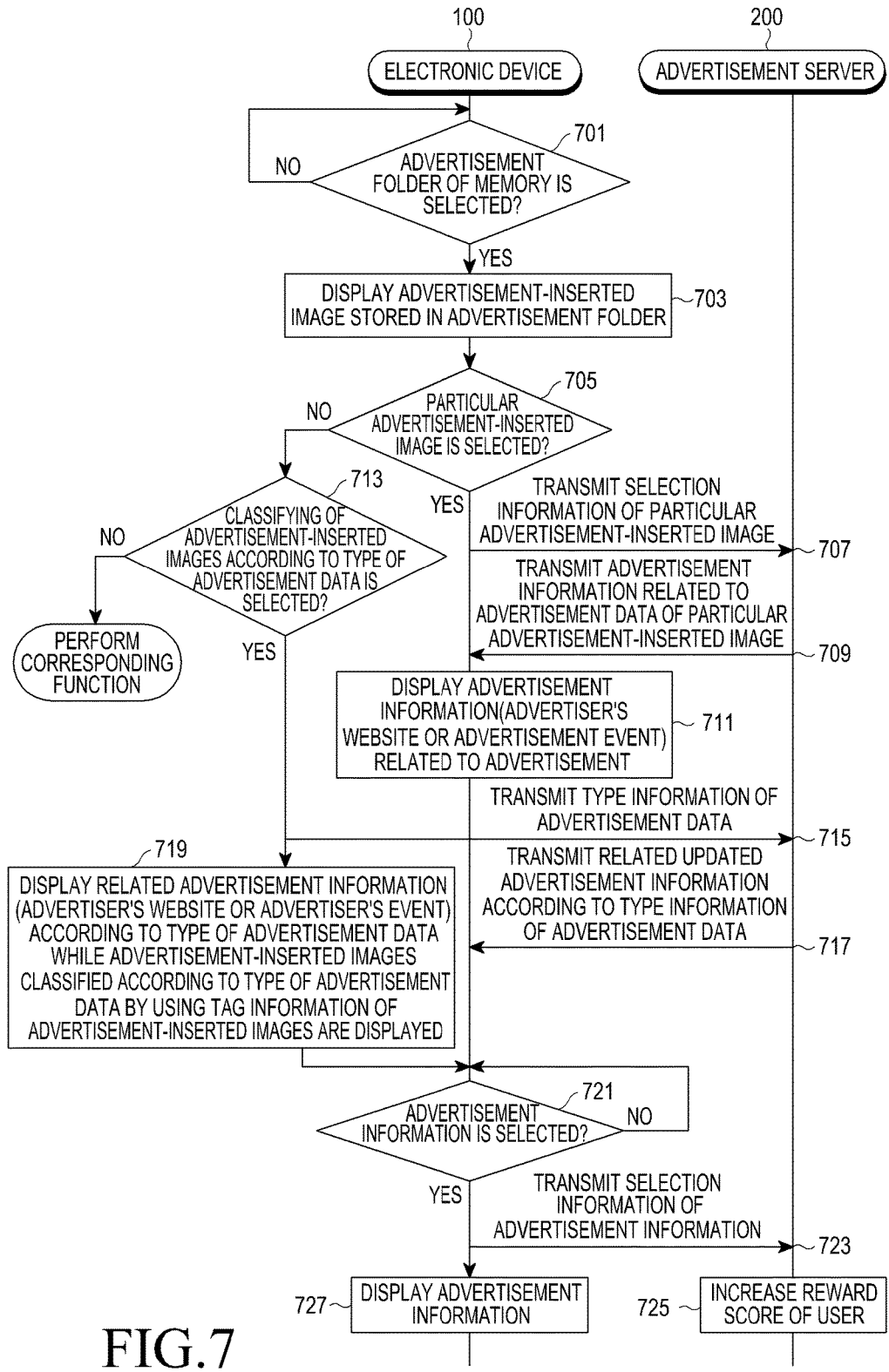
FIG. 7 is a flowchart illustrating an operation of displaying updated advertisement information related to advertisement data of an advertisement-inserted image according to an embodiment of the present disclosure.

FIG. 7 is a flowchart illustrating an operation of displaying updated advertisement information related to advertisement data of the advertisement-inserted image according to an embodiment of the present disclosure.

Hereinafter various embodiments of the present disclosure may be described with reference to FIGS. 1 and 2.

Referring to FIG. 7, when the controller 110 determines that the advertisement folder of the memory 130 is selected in the electronic device 100 in operation 701, the controller 110 may perform operation 703 of displaying one or more advertisement-inserted images stored in the advertisement folder on the display unit 160.

When the controller 110 determines that a particular advertisement-inserted image is selected in operation 705 while the one or more advertisement-inserted images are displayed, the controller 110 may perform operation 707 of transmitting selection information of the particular advertisement-inserted image to the advertisement server 200.

The advertisement server 200 may detect advertisement data information of the particular advertisement-inserted image through the selection information of the particular advertisement-inserted image received from the electronic device 100. When there is updated advertisement information related to the detected advertisement data, the advertisement server 200 may transmit advertisement information related to the advertisement data of the particular advertisement-inserted image to the electronic device 100 in operation 709.

When the controller 110 determines that the advertisement information related to the advertisement data of the particular advertisement-inserted image is received from the advertisement server 200, the controller 110 may display the advertisement information related to the advertisement data of the particular advertisement-inserted image while the particular advertisement-inserted image is displayed in operation 711.

Alternatively, when the controller 110 determines that classifying of images according to a type of advertisement data is selected in operation 713 while the one or more advertisement-inserted images are displayed, the controller 110 may detect information on the advertisement data of each of the one or more advertisement-inserted images by using tag information of each of the one or more advertisement-inserted images stored in the advertisement folder.

Further, the controller 110 may perform operation 715 of transmitting the detected information on the advertisement data to the advertisement server 200 as information on the type of advertisement data.

The advertisement server 200 may detect the type of advertisement data through the information on the type of the advertisement data received from the electronic device 100. When there is related updated advertisement data in the detected type of advertisement data, the advertisement server 200 may transmit the related updated advertisement information according to the type of advertisement data to the electronic device 100 in operation 717.

When the controller 110 determines that the related updated advertisement information according to the type of advertisement data is received from the advertisement server 200, the controller 110 may detect information on the advertisement data of each of the one or more advertisement-inserted images by using the tag information of each of the one or more advertisement-inserted images stored in the advertisement folder and display the advertisement-inserted images classified according to the type of advertisement data in operation 719. In operation 719, the controller 110 may also display related advertisement information according to each type of advertisement data while the advertisement-inserted images classified according to the type of advertisement data are displayed.

The advertisement information may include a website of a company corresponding to the advertisement data or an advertisement event.

When the controller 110 determines that the advertisement information is selected in operation 721 while the advertisement information is displayed together with the advertisement-inserted image, the controller 110 may perform operation 723 of transmitting selection information of the advertisement information to the advertisement server 200. The advertisement server 200 may determine the selection information of the advertisement information received from the electronic device 100 as a reward score, and increase the reward score of the user of the electronic device 100 in operation 725. In operation 725, the advertisement server 200 may differentially increase the reward score of the user of the electronic device 100 according to the type of selected advertisement information (the website of the company corresponding to the advertisement data or the advertisement event) through the selection information of the advertisement information.

The controller 110 having transmitted the selection information of the advertisement information to the advertisement server 200 may perform operation 727 of displaying the selected advertisement information.

For example, when the website of the company corresponding to the advertisement data is selected from the advertisement information, a corresponding page of the company corresponding to the advertisement data may be displayed through an access to the website of the company. Alternatively, when the advertisement event is selected from the advertisement information, a corresponding page including contents of the advertisement event may be displayed through an access to the website of the company corresponding to the advertisement data.

Figure 8:
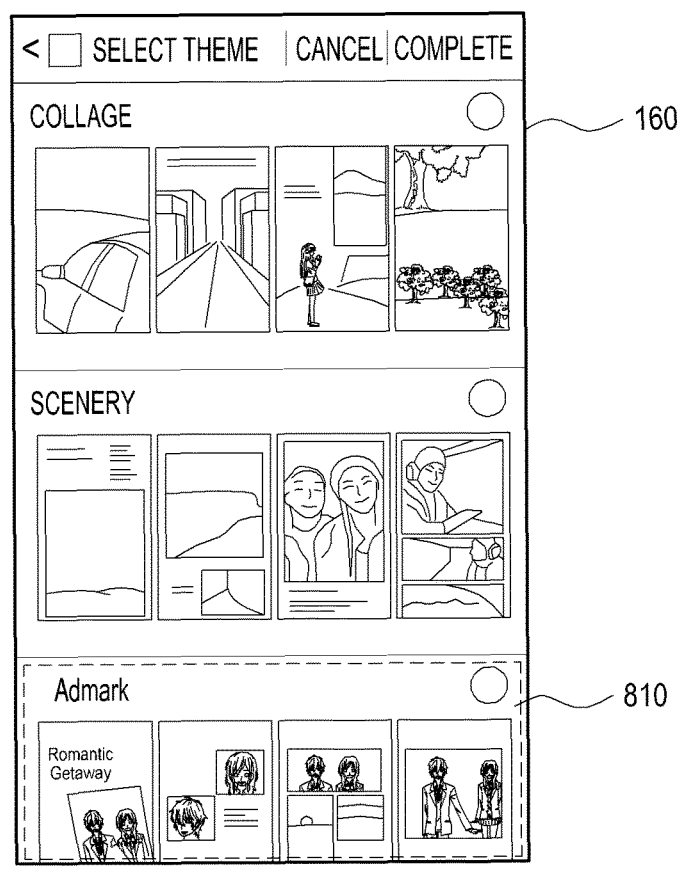
FIG. 8 is a view for describing an operation of classifying advertisement-inserted images stored in an advertisement folder and displaying the classified advertisement-inserted images according to an embodiment of the present disclosure.

FIG. 8 is a view for describing an operation of classifying advertisement-inserted images stored in an advertisement folder and displaying the classified advertisement-inserted images according to an embodiment of the present disclosure.

Referring to FIG. 8, one or more advertisement-inserted images may be stored in an advertisement folder 810 of a picture folder of the memory. When the advertisement folder 810 is selected, the display unit 160 may display the one or more advertisement-inserted images stored in the advertisement folder 810.

Figure 9:
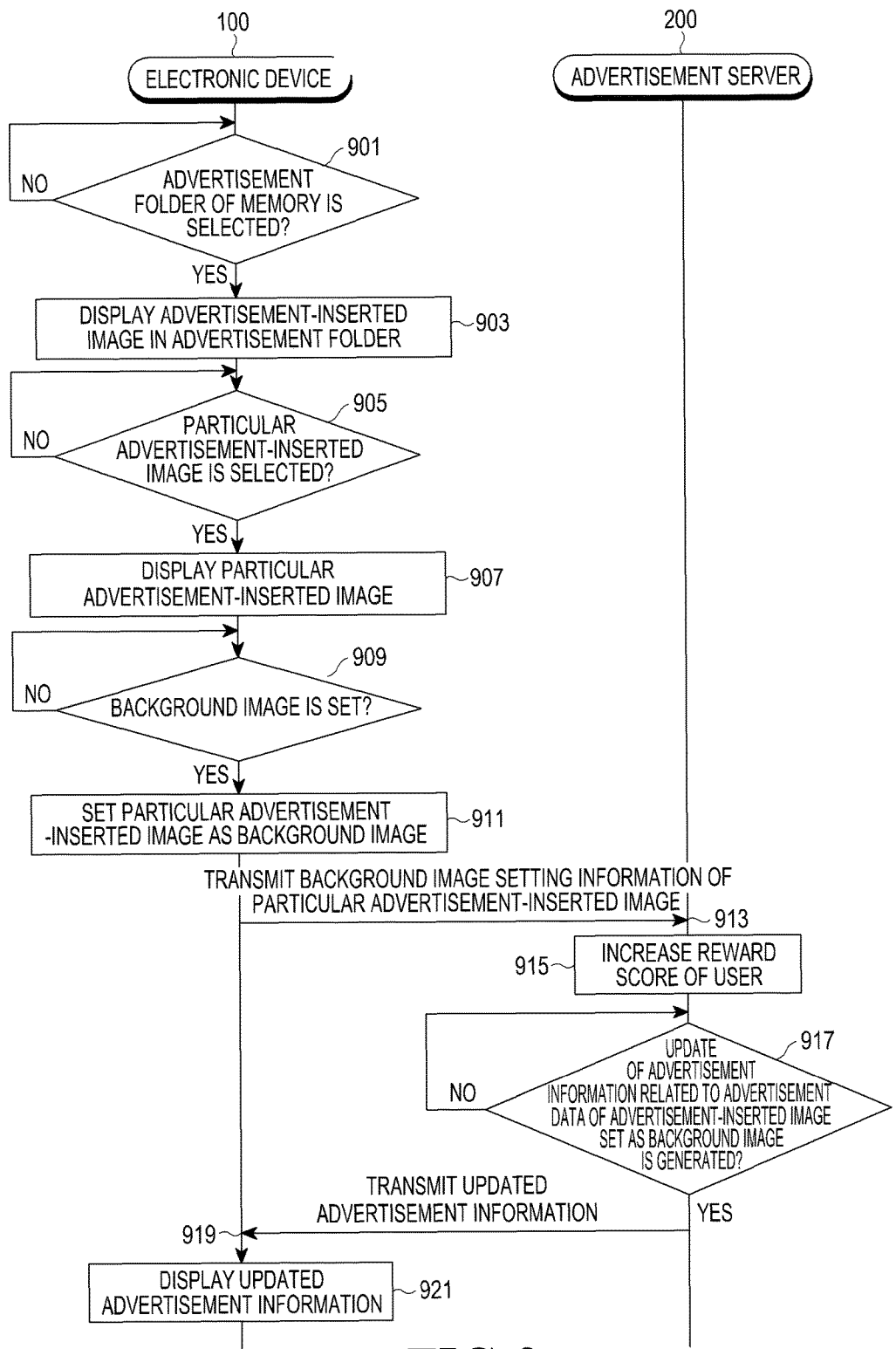
FIG. 9 is a flowchart illustrating an operation of displaying updated advertisement information related to advertisement data of an advertisement-inserted image set as a background image according to an embodiment of the present disclosure.

FIG. 9 is a flowchart illustrating an operation of displaying updated advertisement information related to the advertisement data of an advertisement-inserted image set as a background image according to an embodiment of the present disclosure.

Hereinafter various embodiments of the present disclosure may be described with reference to FIGS. 1 and 2.

Referring to FIG. 9, when the controller 110 determines that the advertisement folder of the memory 130 is selected in the electronic device 100 in operation 901, the controller 110 may perform operation 903 of displaying one or more advertisement-inserted images stored in the advertisement folder on the display unit 160.

When the controller 110 determines that a particular advertisement-inserted image is selected in operation 905 while the one or more advertisement-inserted images are displayed, the controller 110 may transmit selection information of the particular advertisement-inserted image to the advertisement server 200.

Further, the advertisement server 200 may detect advertisement data information of the particular advertisement-inserted image through the selection information of the particular advertisement-inserted image received from the electronic device 100. When there is updated advertisement information related to the detected advertisement data, the advertisement server 200 may transmit advertisement information related to the advertisement data of the particular advertisement-inserted image to the electronic device 100.

When the controller 110 determines that the advertisement information related to the advertisement data of the particular advertisement-inserted image is received from the advertisement server 200, the controller 110 may also display the advertisement information related to the advertisement data of the particular advertisement-inserted image while the particular advertisement-inserted image is displayed.

When the controller 110 determines that a background image setting of the particular advertisement-inserted image is selected in operation 909 while the particular advertisement-inserted image is displayed in operation 907, the controller 110 may perform operation 911 of setting the particular advertisement-inserted image as the background image.

Further, the controller 110 may perform operation 913 of transmitting background image setting information of the particular advertisement-inserted image to the advertisement server 200.

The advertisement server 200 may determine the background image setting information of the particular advertisement-inserted image received from the electronic device 100 as a reward score and perform operation 915 of increasing and storing the reward score of the user of the electronic device. Further, when the advertisement server 200 determines that an update of the advertisement information related to the advertisement data of the particular advertisement-inserted image set as the background image is generated in operation 917, the advertisement server 200 may perform operation 919 of transmitting the updated advertisement information to the electronic device 100.

When the controller 110 receives the updated advertisement information related to the advertisement data of the particular advertisement-inserted image set as the background image from the advertisement server 200, the controller 110 may perform operation 921 of displaying the updated advertisement information in an area of the background image, for example, push notification.

Accordingly, when the particular advertisement-inserted image is set as the background image, the user can continuously receive the updated advertisement information related to the advertisement data of the particular advertisement-inserted image.

The electronic device and the method of providing advertisement data according to various embodiments of the present disclosure can be implemented by a computer-readable code stored in a computer-readable recording medium. The computer-readable recording medium includes all the types of recording devices in which data readable by a computer system are stored. As for such a recording medium, for example, a ROM, a RAM, an optical disc, a magnetic tape, a floppy disc, a hard disc, or a non-volatile memory may be used. In addition, the computer-readable recording medium may be stored with codes which are distributed in computer systems connected by a network such that the codes can be read and executed by a computer in a distributed method.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display; and
at least one processor configured to:
control the display to display a preview image obtained from a camera,
automatically recognize an object included in the preview image,
identify one or more advertisement items from among a plurality of advertisement items according to a type of the object included in the preview image,
control the display to display a list of advertisement items including the identified one or more advertisement items over a portion of the preview image, wherein the list of advertisement items is displayed according to one of an order of provision from an advertisement server or an order of companies close to a current position of the electronic device, the current position being received from a global positioning system (GPS),
receive a selection of an advertisement item from the list that is displayed over the portion of the preview image,
control the display to display the selected advertisement item at a position within the preview image corresponding to the object included in the preview image,
in response to receiving a photographing input while the preview image is displayed on the display, store, in a memory, an image based on the preview image and the selected advertisement item displayed at the position with the preview image,
control the display to display a selected advertisement-inserted image among a plurality of advertisement-inserted images stored in the electronic device,
control the display to update and display updated advertisement information related to the selected advertisement item of the selected advertisement-inserted image while the selected advertisement-inserted image is displayed, and
control a transceiver to transmit information regarding the selection of the selected advertisement item to the advertisement server.

2. The electronic device of claim 1, wherein, when the advertisement item is selected from the list, the at least one processor is further configured to:
transmit the information regarding the selection of the selected advertisement item to the advertisement server to increase a reward score for a user of the electronic device, and
insert the selected advertisement item into one or more objects of the preview image.

3. The electronic device of claim 2, wherein the at least one processor is further configured to:
edit the selected advertisement item,
store editing information of the selected advertisement item when editing the selected advertisement item,
store the image into which the selected advertisement item is inserted as the advertisement-inserted image in the memory when photographing is selected while the preview image into which the selected advertisement item is inserted is displayed, and
transmit at least one of the editing information of the advertisement-inserted image or storage information of the advertisement-inserted image to the advertisement server to increase the reward score.

4. The electronic device of claim 3,
wherein the memory is further configured to store the advertisement-inserted image together with tag information, and
wherein the tag information comprises information on the selected advertisement item inserted into the advertisement-inserted image.

5. The electronic device of claim 1, wherein the selected advertisement item includes at least one of an advertisement logo or an advertisement background image.

6. The electronic device of claim 1, wherein the at least one processor is further configured to:
control the display to sequentially display a first plurality of advertisement items received from the advertisement server according to one of an order of provision from the advertisement server,
an order of companies close to a current position of the electronic device, or a user preference, and
control the display to display an indicator informing that an event is generated in at least one of the first plurality of advertisement items.

7. The electronic device of claim 1, wherein the at least one processor is further configured to recognize the object included in the preview image while the preview image is displayed on the display.

8. The electronic device of claim 1, wherein the at least one processor is further configured to:
control the transceiver to transmit the information of the selected advertisement-inserted image to the advertisement server to increase a reward score, and
control the transceiver to receive updated advertisement information related to the selected advertisement item of the selected advertisement-inserted image from the advertisement server.

9. The electronic device of claim 1,
wherein the at least one processor is further configured to control the display to update and display updated advertisement information related to the selected advertisement-inserted image according to a type of the selected advertisement item of the selected advertisement-inserted image, wherein the plurality of stored advertisement-inserted images are classified according to the type of the selected advertisement item, and wherein the plurality of stored advertisement-inserted images are displayed based on tag information on each of the plurality of stored advertisement-inserted images.

10. The electronic device of claim 9, wherein the at least one processor is further configured to:

control the transceiver to transmit information of the type of the selected advertisement item of the selected advertisement-inserted image to the advertisement server to increase a reward score, and control the transceiver to receive the updated advertisement information related to the selected advertisement item of the selected advertisement-inserted image according to the type of the selected advertisement item from the advertisement server.

11. The electronic device of claim 1, wherein the at least one processor is further configured to:

control the display to display the selected advertisement-inserted image from among the plurality of advertisement-inserted images stored in the electronic device as a background image, and control the display to update and display advertisement information related to the selected advertisement-inserted image received from the advertisement server while the selected advertisement-inserted image is displayed as the background image.

12. The electronic device of claim 11, wherein the at least one processor is further configured to:

control the transceiver to transmit background image setting information of the selected advertisement-inserted image to the advertisement server to increase a reward score, and control the transceiver to receive updated advertisement information related to the selected advertisement item of the selected advertisement-inserted image from the advertisement server.

13. A method of providing advertisement items by an electronic device, the method comprising:

displaying a preview image obtained from a camera;

automatically recognizing an object included in the preview image;

identifying one or more advertisement items from among a plurality of advertisement items according to a type of the object included in the preview image;

displaying a list of advertisement items including the identified one or more advertisement items over a portion of the preview image, wherein the list of advertisement items is displayed according to one of an order of provision from an advertisement server or an order of companies close to a current position of the electronic device, the current position being received from a global positioning system (GPS);

receiving a selection of an advertisement item from the list that is displayed over the portion of the preview image;

displaying the selected advertisement item at a position within the preview image corresponding to the object included in the preview image;

in response to receiving a photographing input while the preview image is displayed on a display, storing, in a memory, an image based on the preview image and the selected advertisement item displayed at the position with the preview image;

displaying a selected advertisement-inserted image among a plurality of advertisement-inserted images stored in the electronic device;

updating and displaying updated advertisement information related to the selected advertisement item of the selected advertisement-inserted image while the selected advertisement-inserted image is displayed; and transmitting information regarding the selection of the selected advertisement item to the advertisement server.

14. The method of claim 13, further comprising, when the advertisement item is selected from the list:

transmitting the information regarding the selection of the selected advertisement item to the advertisement server to increase a reward score for a user of the electronic device; and inserting the selected advertisement item into one or more objects of the preview image.

15. The method of claim 14, further comprising:

editing the selected advertisement item;

storing editing information of the selected advertisement item when editing the selected advertisement item;

storing the image into which the selected advertisement item is inserted as the advertisement-inserted image when photographing is selected while the preview image into which the selected advertisement item is inserted is displayed; and transmitting at least one of the editing information of the advertisement-inserted image or storage information of the advertisement-inserted image to the advertisement server to increase the reward score.

16. The method of claim 15, further comprising:

storing the advertisement-inserted image together with tag information, wherein the tag information comprises information on the selected advertisement item inserted into the advertisement-inserted image.

17. The method of claim 13, wherein the selected advertisement item includes at least one of an advertisement logo or an advertisement background image.

18. The method of claim 13, further comprising:

sequentially displaying a first plurality of advertisement items received from the advertisement server according to one of an order of provision from the advertisement server, an order of companies close to a current position of the electronic device, or a user preference; and displaying an indicator informing that an event is generated in at least one of the first plurality of advertisement items.

19. The method of claim 13, further comprising recognizing the object included in the preview image while the preview image is displayed on the display.

20. The method of claim 13, further comprising:

transmitting selection information of the selected advertisement-inserted image to the advertisement server to increase a reward score; and receiving updated advertisement information related to the selected advertisement item of the selected advertisement-inserted image from the advertisement server.

21. The method of claim 13, further comprising:

updating and displaying advertisement information related to the selected advertisement-inserted image according to a type of the selected advertisement item of the selected advertisement-inserted image, wherein the plurality of stored advertisement-inserted images are classified according to the type of the selected advertisement item, and wherein the plurality of stored advertisement-inserted images are displayed based on tag information on each of the plurality of stored advertisement-inserted images.

22. The method of claim 21, further comprising:
transmitting information of the type of the selected advertisement item of the selected advertisement-inserted image to the advertisement server to increase a reward score; and receiving updated advertisement information related to the selected advertisement item of the selected advertisement-inserted image according to the type of the selected advertisement item from the advertisement server.

23. The method of claim 13, further comprising:
displaying the selected advertisement-inserted image from among the plurality of advertisement-inserted images stored in the electronic device as a background image; and updating and displaying advertisement information related to the selected advertisement-inserted image received from the advertisement server while the selected advertisement-inserted image is displayed as the background image.

24. The method of claim 23, further comprising:
transmitting background image setting information of the selected advertisement-inserted image to the advertisement server to increase a reward score; and receiving updated advertisement information related to the selected advertisement item of the selected advertisement-inserted image from the advertisement server.

* * * * *